(12) United States Patent
Sada et al.

(10) Patent No.: US 9,933,066 B2
(45) Date of Patent: Apr. 3, 2018

(54) VEHICLE DRIVE TRANSFER APPARATUS (71) Applicants: AISIN AW CO., LTD., Anjo-shi, Aichi-ken (JP); TOYOTA JIDOSHA KABUSHIKI KAISHA, Toyota-shi, Aichi-ken (JP)

(72) Inventors: Natsuki Sada, Anjo (JP); Atsushi Teshima, Toyota (JP); Mitsuki Watanabe, Anjo (JP); Kenji Asai, Anjo (JP); Makoto Taniguchi, Toyota (JP)

(73) Assignees: AISIN AW CO., LTD., Anjo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 191 days.

(21) Appl. No.: 15/035,423

(22) PCT Filed: Oct. 30, 2014

(86) PCT No.: PCT/JP2014/078916
§ 371 (c)(1),
(2) Date: May 9, 2016

(87) PCT Pub. No.: WO2015/079864
PCT Pub. Date: Jun. 4, 2015

(65) Prior Publication Data
US 2016/0290480 A1 Oct. 6, 2016

(30) Foreign Application Priority Data

Nov. 26, 2013 (JP) ................................. 2013-244134

(51) Int. Cl.
*F16H 57/04* (2010.01)
*B60K 6/50* (2007.10)
(Continued)

(52) U.S. Cl.
CPC .......... *F16H 57/0427* (2013.01); *B60K 6/50* (2013.01); *F16H 3/727* (2013.01); *F16H 57/04* (2013.01);
(Continued)

(58) Field of Classification Search
CPC ............. F16H 57/0427; F16H 57/0482; F16H 57/0479; F16H 57/043; F16H 57/082; F16H 2057/085
(Continued)

(56) References Cited

U.S. PATENT DOCUMENTS 5,910,063 A * 6/1999 Kato ................... F16H 57/0427
475/159
2011/0230292 A1 9/2011 Komatsu et al.
(Continued)

FOREIGN PATENT DOCUMENTS

JP S50-4179 U 1/1975
JP H09-4700 A 1/1997
(Continued)

OTHER PUBLICATIONS

Feb. 3, 2015 Search Report issued in International Patent Application No. PCT/JP2014/078916.

*Primary Examiner* — Roger L Pang
(74) *Attorney, Agent, or Firm* — Oliff PLC (57) ABSTRACT

A vehicle drive transfer apparatus including a planetary gear mechanism including a carrier for supporting a sun gear, a ring gear, and a plurality of pinion gears through pinion shafts and pinion bearings, wherein an in-shaft oil passage is provided in each of the pinion shafts to supply lubricating oil to each of the pinion bearings; and an oil receiver attached to the carrier to receive lubricating oil supplied from an oil supplier and lead the lubricating oil to the in-shaft oil passage in each of the pinion shafts.

19 Claims, 5 Drawing Sheets (51) Int. Cl.
 *F16H 3/72* (2006.01)
 *F16H 57/08* (2006.01)

(52) U.S. Cl.
 CPC ......... *F16H 57/043* (2013.01); *F16H 57/045* (2013.01); *F16H 57/0447* (2013.01); *F16H 57/0453* (2013.01); *F16H 57/0479* (2013.01); *F16H 57/0482* (2013.01); *F16H 57/0483* (2013.01); *F16H 57/082* (2013.01); *F16H 2057/085* (2013.01)

(58) Field of Classification Search
 USPC .......................................................... 475/159
 See application file for complete search history.

(56) References Cited

U.S. PATENT DOCUMENTS

2013/0283972 A1* 10/2013 Yamamoto ............. B60K 6/405
 74/665 B
2013/0305878 A1* 11/2013 Seno ................... F16H 57/0423
 74/665 A

FOREIGN PATENT DOCUMENTS

| JP | 2003-278892 A |   | 10/2003 |
|----|---------------|---|---------|
| JP | 2011-214715 A |   | 10/2011 |
| JP | 2012017763 A  | * | 1/2012  |
| JP | 2010156415 A  | * | 7/2015  |

\* cited by examiner

VEHICLE DRIVE TRANSFER APPARATUS

BACKGROUND

The present disclosure relates to a vehicle drive transfer apparatus that includes: a planetary gear mechanism including a carrier for supporting a sun gear, a ring gear, and a plurality of pinion gears through pinion shafts and pinion bearings; an in-shaft oil passage provided in each of the pinion shafts to supply lubricating oil to each of the pinion bearings; and an oil receiver attached to the carrier to receive lubricating oil supplied from an oil supply unit and lead the lubricating oil to the in-shaft oil passages in the pinion shafts.

A known example of the vehicle drive transfer apparatus described above is an apparatus described in Japanese Patent Application Publication No. 2011-214715. In the technique of Japanese Patent Application Publication No. 2011-214715, an oil receiver extends from an axial end face of a carrier axially and radially inward, and forms an inclined surface that is continuous over the entire circumference. The inclined surface is configured to receive lubricating oil from an oil supply unit disposed radially inward of the inclined surface and lead the lubricating oil to an in-shaft oil passage in a pinion shaft.

SUMMARY

In the technique of Japanese Patent Application Publication No. 2011-214715, it is considered that lubricating oil adhering to the inclined surface flows along the inclined surface by a centrifugal force while being dispersed over the entire circumference to an end facing the carrier, and is accumulated in a space between the end of the inclined surface and the carrier in the entire circumference thereof. The accumulated lubricating oil flows into an opening in the in-shaft oil passage. However, in a case where a slight clearance is present between the oil receiver and the carrier, the lubricating oil in the space may leak radially outward through the clearance, so that the amount of lubricating oil supplied from the opening to the in-shaft oil passage decreases by an amount corresponding to the amount of leaked lubricating oil.

In view of this, there has been a need for a vehicle drive transfer apparatus that can suppress a decrease in the amount of lubricating oil supplied from an opening to an in-shaft oil passage by suppressing leakage of lubricating oil supplied to an oil receiver into a clearance between the oil receiver and a carrier.

A vehicle drive transfer apparatus according to an exemplary aspect of the present disclosure includes a planetary gear mechanism including a carrier for supporting a sun gear, a ring gear, and a plurality of pinion gears through pinion shafts and pinion bearings, wherein an in-shaft oil passage is provided in each of the pinion shafts to supply lubricating oil to each of the pinion bearings; and an oil receiver attached to the carrier to receive lubricating oil supplied from an oil supplier and lead the lubricating oil to the in-shaft oil passage in each of the pinion shafts, in which the carrier is coupled to a unidirectional rotating member that rotates only in one direction, the in-shaft oil passage in each of the pinion shafts has an opening that is open at an end face of the carrier facing in a first axial direction that is one axial direction side of the carrier, the oil receiver includes an oil receiving portion that extends from the end face of the carrier facing in the first axial direction to the first axial direction and radially inward and is formed to be continuous over an entire circumference of the oil receiver, the oil supplier is disposed radially inward of the oil receiving portion, the oil receiving portion includes a projecting portion partially projecting radially inward of the carrier, a plurality of the projecting portions are provided corresponding to a plurality of the openings, and each of the projecting portions is disposed ahead, in a rotation direction of the carrier, of a center location between two of the openings that are adjacent to each other in a circumferential direction of the carrier.

Lubricating oil supplied from the oil supplier disposed radially inward of the oil receiving portion adheres to a radially inner surface of the oil receiving portion. Since the carrier rotates together with the unidirectional rotating member, the oil receiving portion fixed to the carrier also rotates together with the unidirectional rotating member. The oil receiving portion includes an inclined surface extending in the first axial direction and radially inward. The lubricating oil adhering to the oil receiving portion flows along the inclined surface in an axial direction toward a carrier (a direction opposite to the first axial direction) by a centrifugal force caused by rotation. The lubricating oil flows with a delay in the oil receiving portion due to air resistance, and thus, also flows in a direction opposite to the rotation direction of the oil receiving portion relatively to the oil receiving portion. Thus, the lubricating oil axially flows along the inclined surface radially inward of the oil receiving portion toward the carrier and the direction opposite to the rotation direction with respect to the rotating oil receiving portion.

In the configuration of the present disclosure, the lubricating oil axially flowing toward the carrier and in the direction opposite to the rotation direction along the inclined surface of the oil receiving portion is blocked by the projecting portion, so that flow of the lubricating oil is disturbed. Thus, the lubricating oil flowing radially outward by a centrifugal force is disturbed, so that a larger amount of lubricating oil can axially flow toward the carrier. In this manner, the amount of oil that leaks radially outward through a clearance between the carrier and the oil receiver can be reduced.

In addition, in the characteristic configuration described above, the projecting portions are provided corresponding to the plurality of openings, and each of the projecting portions is disposed ahead, in a rotation direction of the carrier, of a center location between two of the openings that are adjacent to each other in a circumferential direction of the carrier. In this configuration, openings can be disposed closer to the projecting portions and also on the rotation direction side of the projecting portions, so that the lubricating oil blocked by the projecting portions can be easily led to the openings.

Accordingly, it is possible to suppress a decrease in the amount of lubricating oil supplied from the openings to the in-shaft oil passages by suppressing leakage of the lubricating oil supplied to the oil receiver through the clearance between the oil receiver and the carrier. As a result, the pinion bearings can be efficiently and favorably lubricated.

The projecting portions are preferably disposed so as to overlap the pinion shafts when viewed in the axial direction of the carrier.

With this configuration, the lubricating oil blocked by the projecting portions can be more easily led to the openings formed in the pinion shafts.

The projecting portions are preferably disposed so as to overlap the openings when viewed in the axial direction of the carrier.

With this configuration, the lubricating oil blocked by the projecting portions can be led directly to the openings formed in the pinion shafts.

The end of the oil receiving portion opposite to the first axial direction is preferably disposed so as to overlap the openings when viewed in the axial direction of the carrier.

With this configuration, the lubricating oil that has flowed along the inclined surface of the oil receiving portion to the axial end facing the carrier (the end facing in the direction opposite to the first axial direction) can be easily led to the openings.

The outer peripheral portion of the oil receiver is preferably partially swaged to the carrier, and the oil receiver is attached to the carrier.

With this configuration, the oil receiver can be easily attached to the carrier at low costs.

The oil receiver preferably includes an attachment portion that has an annular plate shape and is in contact with the end face of the carrier facing in the first axial direction, and the oil receiving portion is preferably formed so as to extend from a radially inner end of the attachment portion to the first axial direction and radially inward.

With this configuration, the oil receiver can be stably attached to the carrier by bringing the attachment portion having an annular plate shape into contact with the end face of the carrier facing in the first axial direction. In addition, the degree of adhesion between the oil receiver and the carrier can be increased, so that the amount of lubricating oil that leaks through a clearance between the oil receiver and the carrier can be reduced.

DETAILED DESCRIPTION OF EMBODIMENTS

Figure 1:
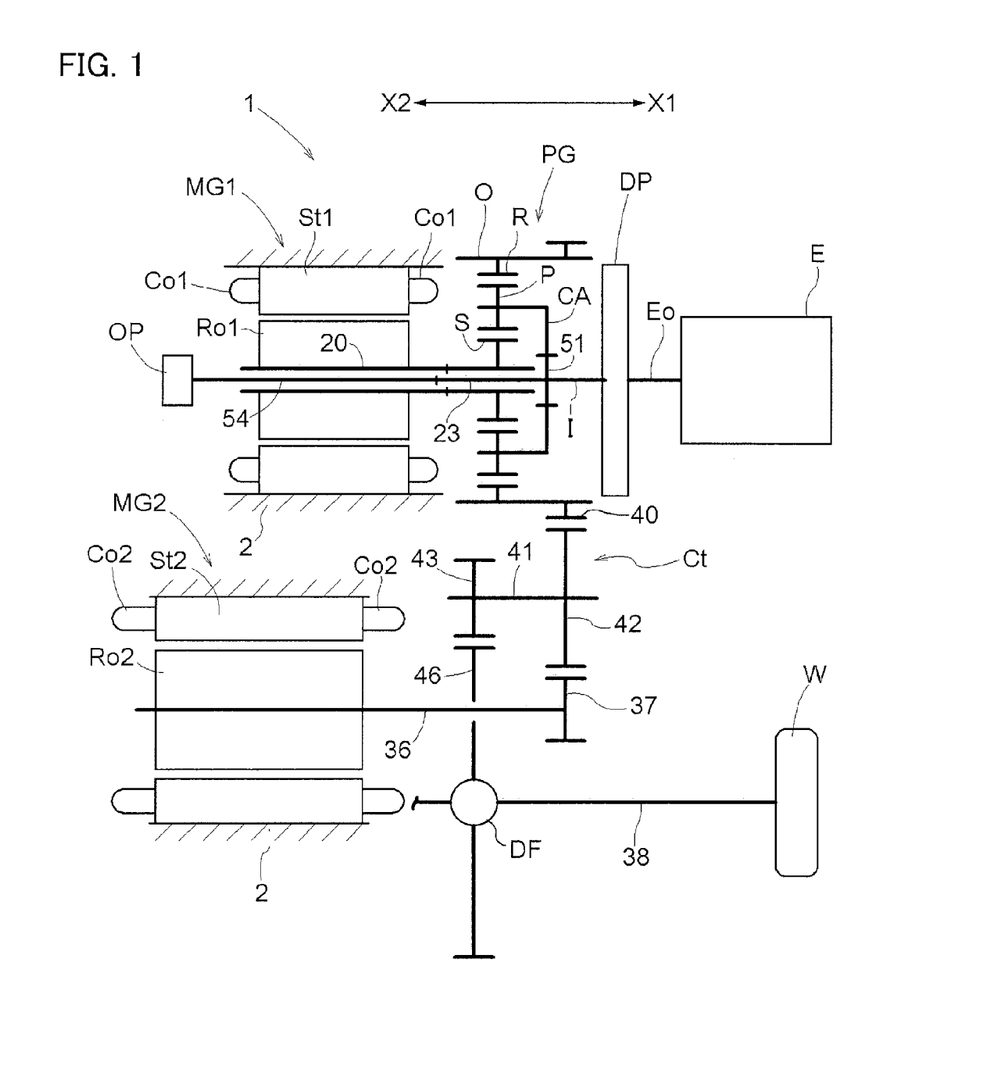
FIG. 1 is a skeleton view of a vehicle drive transfer apparatus according to an embodiment of the present disclosure.
Figure 2:
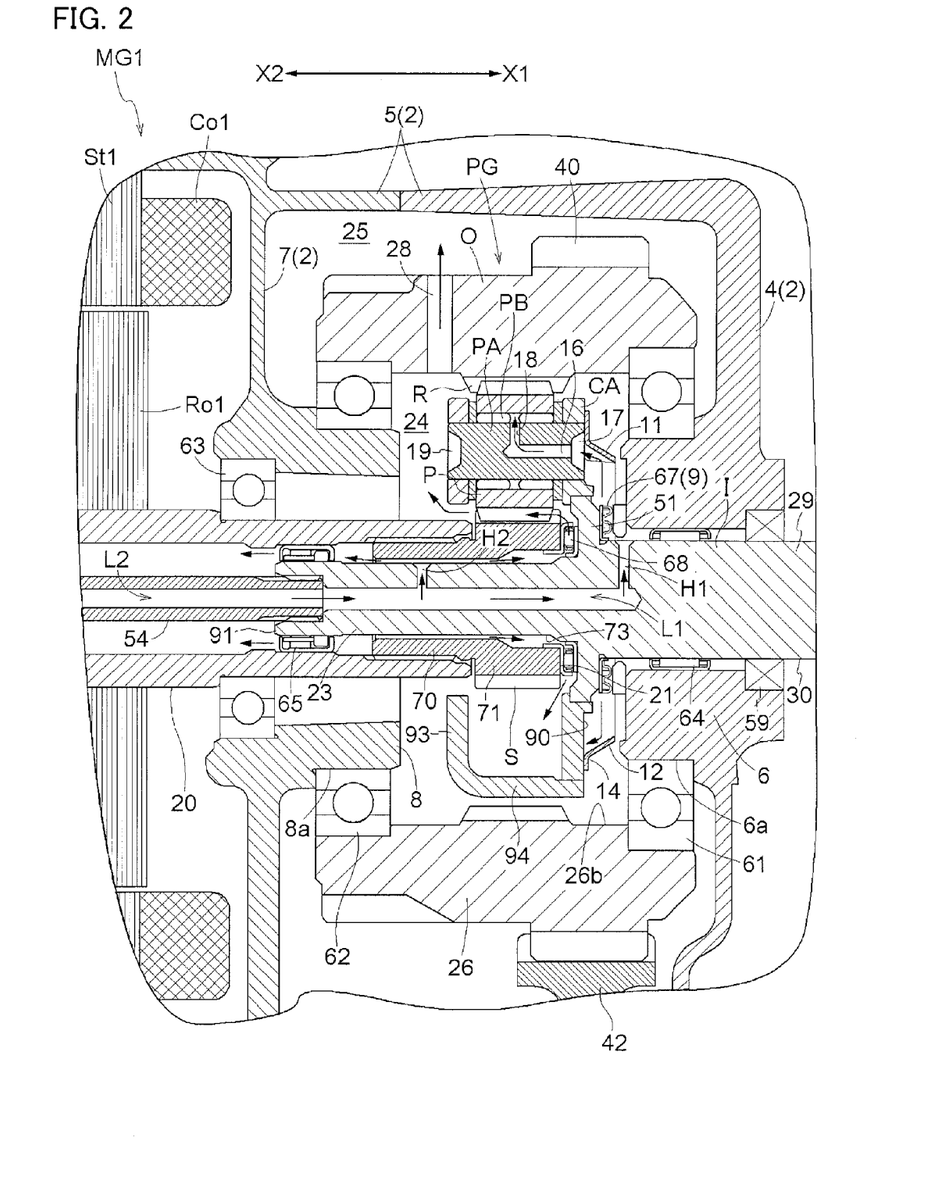
FIG. 2 is an axial cross-sectional view illustrating a main portion of the vehicle drive transfer apparatus according to the embodiment of the present disclosure, which is taken along a plane parallel to an axial direction.

A vehicle drive transfer apparatus 1 according to an embodiment of the present disclosure will be described with reference to the drawings. FIG. 1 is a skeleton view schematically illustrating the vehicle drive transfer apparatus 1 according to the embodiment. FIG. 2 is a cross-sectional view illustrating a main portion of the vehicle drive transfer apparatus 1 according to the embodiment, which is taken along a plane orthogonal to an axial direction.

In this embodiment, as illustrated in FIGS. 1 and 2, the vehicle drive transfer apparatus 1 includes: a planetary gear mechanism PG including a carrier CA for supporting a sun gear S, a ring gear R, and a plurality of pinion gears P through pinion shafts PA and pinion bearings PB; an in-shaft oil passage 16 provided in each of the pinion shafts PA to supply lubricating oil to each of the pinion bearings PB; and an oil receiver 11 attached to the carrier CA to receive lubricating oil supplied from an oil supply unit 9 (oil supplier) and lead the lubricating oil to the in-shaft oil passage 16 in each of the pinion shafts PA.

The carrier CA is coupled to an input shaft I serving as a unidirectional rotating member that rotates only in one direction. The in-shaft oil passage 16 in each of the pinion shafts PA has an opening (hereinafter referred to as a first opening 17) that is open at an end face thereof facing in a first axial direction X1 that is one axial direction side of the carrier CA.

As illustrated in FIG. 2 and FIGS. 4 through 6, the oil receiver 11 includes an oil receiving portion 12 extending in the first axial direction X1 and radially inward from an end face of the carrier CA facing in the first axial direction X1 and continuously formed along the entire circumference of the oil receiver 11. The oil supply unit 9 is disposed radially inward of oil receiving portion 12.

With respect to axial directions passing through the rotation axial center of the carrier CA, a direction from the carrier CA toward the oil receiver 11 (right side in FIGS. 1 and 2) is defined as the first axial direction X1, and the direction from the oil receiver 11 toward the carrier CA (left side in FIGS. 1 and 2), which is the opposite direction, is defined as a second axial direction X2. In the following description, when a direction is simply referred to, such as an axial direction (axially), a radial direction (radially), or a circumferential direction, this means an axial direction, a radial direction, or a circumferential direction of the carrier CA.

Figure 5:
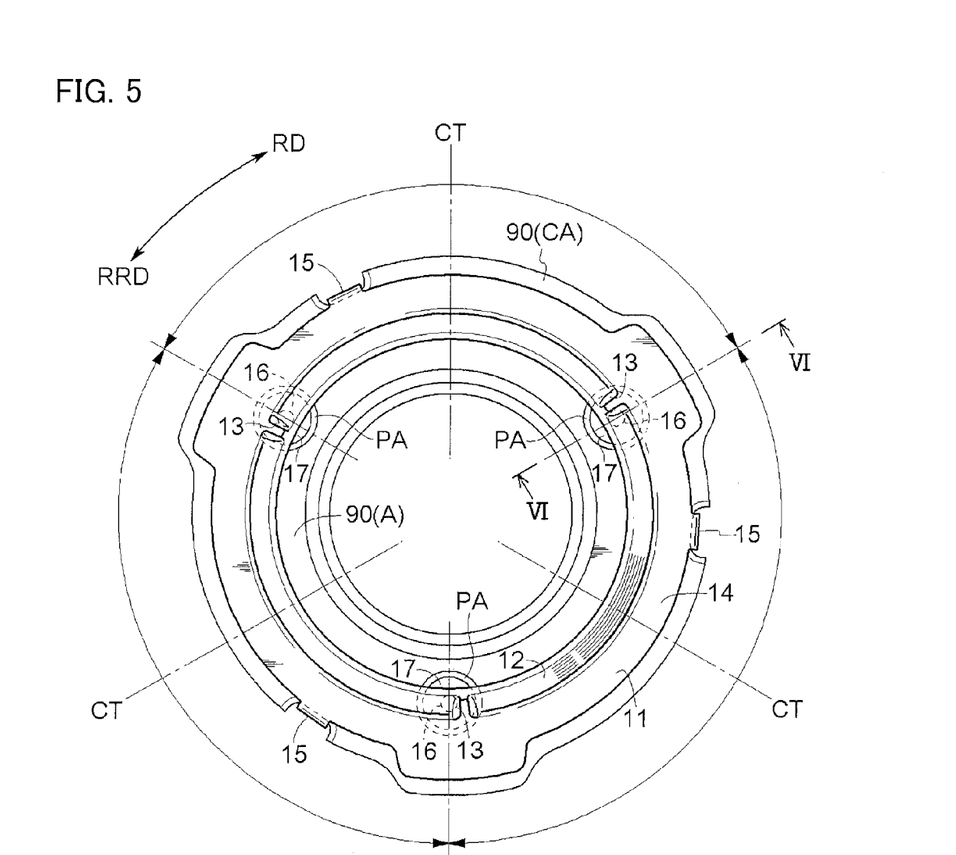
FIG. 5 is a plan view illustrating the oil receiver, the carrier, and the pinion shafts according to the embodiment of the present disclosure when viewed in a first axial direction.

The oil receiving portion 12 includes projecting portions 13 partially projecting radially inward of the carrier CA. The projecting portions 13 are provided corresponding to the plurality of first openings 17. As illustrated in FIG. 5, as a characteristic of the embodiment, each of the projecting portions 13 is disposed ahead, in a rotation direction RD of the carrier CA, of a center location CT between two of the first openings 17 that are adjacent to each other in the circumferential direction of the carrier CA.

The vehicle drive transfer apparatus 1 according to the embodiment will now be described in detail.

1. Schematic Configuration of Vehicle Drive Transfer Apparatus 1

First, an overall configuration of the vehicle drive transfer apparatus 1 according to the embodiment will be described.

In the embodiment, as illustrated in FIG. 1, the vehicle drive transfer apparatus 1 includes, for example, a first rotary electric machine MG1, a second rotary electric machine MG2, and a counter gear mechanism Ct in addition to the planetary gear mechanism PG. The sun gear S of the planetary gear mechanism PG is drivingly coupled to the first rotary electric machine MG1, and the ring gear R of the planetary gear mechanism PG is drivingly coupled to wheels W and the second rotary electric machine MG2 through, for example, the counter gear mechanism Ct. An input shaft I serving as a unidirectional rotating member coupled to the carrier CA is drivingly coupled to an internal combustion engine E.

The term "drivingly coupled" herein refers to a state in which two rotary elements are coupled to each other such that the rotary elements can transfer a drive force, and includes a state in which the two rotary elements are coupled to each other such that the rotary elements rotate together, and a state in which the two rotary elements are coupled to each other such that the rotary elements can transfer a drive force through one or more transmission members. Examples of such a transmission member include various members that transfer rotation at a constant speed or with shifted speeds, such as a shaft, a gear mechanism, a friction engagement element, a belt, and a chain.

The input shaft I is drivingly coupled to the internal combustion engine E. The internal combustion engine E is a heat engine driven by combustion of fuel, and may be, for example, various known engines such as a gasoline engine and a diesel engine.

In this example, the input shaft I is drivingly coupled to an engine output shaft Eo such as a crankshaft of the internal combustion engine E through a damper DP. The input shaft I is also preferably drivingly coupled to the engine output shaft Eo through, for example, a clutch in addition to the damper DP, or alternatively, is also preferably drivingly coupled directly to the engine output shaft Eo without using any of the damper DP and the clutch, for example.

The first rotary electric machine MG1 includes a first stator SO fixed to the case 2, and a first rotor Ro1 rotatably supported on a radially inner side of the first stator St1. The first rotor Ro1 is drivingly coupled to the sun gear S of the planetary gear mechanism PG through the first rotor shaft 20 such that the first rotor Ro1 can rotate together with the sun gear S. The first stator St1 is provided with a coil Co1. The first rotary electric machine MG1 can function as a motor (electric motor) that receives supply of electric power and generates power, and as a generator (power generator) that receives supply of power and generates electric power. Thus, the first rotary electric machine MG1 is electrically connected to an unillustrated storage device. In this example, the first rotary electric machine MG1 functions as a generator that generates electric power mainly with torque of the input shaft I (internal combustion engine E) input through the planetary gear mechanism PG, and charges the storage device or supplies electric power for driving the second rotary electric machine MG2. While the vehicle is traveling at high speed or the internal combustion engine E is started, for example, the first rotary electric machine MG1 may function as a motor that performs power running to output a drive force in some cases.

The second rotary electric machine MG2 includes a second stator St2 fixed to the case 2 and a second rotor Ro2 rotatably supported on a radially inner side of the second stator St2. The second rotor Ro2 is drivingly coupled to an output gear 37 through a second rotor shaft 36 such that the second rotor Ro2 can rotate together with the output gear 37. The second rotary electric machine MG2 can function as a motor (electric motor) that receives supply of electric power and generates power and function as a generator (power generator) that receives supply of power and generates electric power. Thus, the second rotary electric machine MG2 is also electrically connected to the storage device. In this example, the second rotary electric machine MG2 functions mainly as a motor assisting a drive force for causing the vehicle to travel. In deceleration of the vehicle, for example, the second rotary electric machine MG2 may function as a generator that regenerates an inertial force of the vehicle as electric energy.

In the embodiment, the planetary gear mechanism PG is a single pinion planetary gear mechanism coaxially disposed with the input shaft I. Specifically, the planetary gear mechanism PG includes three rotary elements, that is, the carrier CA coupled to the pinion shafts PS supporting the pinion gears P, the sun gear S meshing with the pinion gears P, and the ring gear R.

Figure 3:
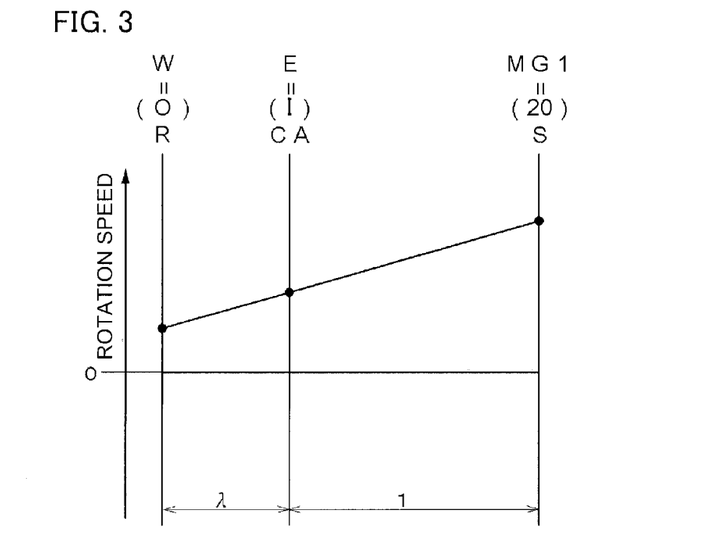
FIG. 3 is a velocity diagram of a planetary gear mechanism according to the embodiment of the present disclosure.

FIG. 3 is a velocity diagram of the planetary gear mechanism PG. In the velocity diagram, the ordinate represents the rotation speed of each rotary element. A range where the rotation speed exceeds zero corresponds to a normal rotation (positive rotation speed), and a range where the rotation speed is below zero corresponds to a negative rotation (negative rotation speed). Each of the vertical lines arranged in a row in the velocity diagram corresponds to a ring gear R, a carrier CA, and a sun gear S of the planetary gear mechanism PG. The intervals between the plurality of vertical lines arranged in a row are defined based on a gear ratio $\lambda$ (gear ratio of sun gear and ring gear=[number of teeth of sun gear]/[number of teeth of ring gear]) of the planetary gear mechanism PG. As shown in FIG. 3, the three rotary elements of the planetary gear mechanism PG are the sun gear S, the carrier CA, and the ring gear R arranged in the order of rotation speed. The "order of rotation speed" herein is the order from a higher speed to a lower speed or the order from a lower speed to a higher speed, and can be selected depending on the rotation state of the planetary gear mechanism PG. In any case, the order of the rotary elements is not changed.

The sun gear S rotates together with the first rotor shaft 20, and the first rotor shaft 20 is drivingly coupled to the first rotary electric machine MG1 so as to rotate together with the first rotary electric machine MG1. The carrier CA rotates together with the input shaft I, and the input shaft I is drivingly coupled to the internal combustion engine E so as to rotate together with the internal combustion engine E. The ring gear R is coupled to the output member O so as to rotate together with the output member O, and the output member O is drivingly coupled to the wheels W and the second rotary electric machine MG2.

The counter gear mechanism Ct reverses the rotation direction of the output member O, and transfers torque to be transferred from the output member O toward the wheels W. The counter gear mechanism Ct includes a counter shaft 41, a first gear 42, and a second gear 43. The first gear 42 meshes with the output gear 40 that rotates together with the output member O. The first gear 42 also meshes with the output gear 37 of the second rotary electric machine MG2 at a location different from the output gear 40 in a circumferential direction. The second gear 43 meshes with a differential input gear 46 included in an output differential gear device DF described later. Thus, the counter gear mechanism Ct reverses the rotation direction of each of the output gear 40 of the output member O and the output gear 37 of the second rotary electric machine MG2, and transfers torque to be transferred to the output gear 40 of the output member O and torque of the second rotary electric machine MG2 to the output differential gear device DF.

The output differential gear device DF includes the differential input gear 46, distributes and transfers torque to be transferred to the differential input gear 46 to a plurality of wheels W. In this example, the output differential gear device DF is a differential gear mechanism including a plurality of bevel gears that mesh with each other, and distributes and transfers torque to be transferred to the differential input gear 46 through the second gear 43 of the counter gear mechanism Ct to two left and right wheels W through an axle 38.

In the vehicle drive transfer apparatus 1 according to the embodiment, the planetary gear mechanism PG, the first rotor shaft 20, the input shaft I, the first rotary electric machine MG1, and the internal combustion engine E are coaxially arranged, and the second rotary electric machine MG2 is disposed on an axis different from that of the first rotary electric machine MG1 and other components.

2. Configuration of Main Portion of Vehicle Drive Transfer Apparatus 1

Then, configuration of a main portion of the vehicle drive transfer apparatus 1 according to the embodiment will be described.

<Case 2>

As illustrated in FIG. 2, components of the vehicle drive transfer apparatus 1, such as the planetary gear mechanism PG, are housed in a gear housing chamber 25 of the case 2.

The case 2 includes a peripheral wall 5 formed to surround the outer peripheries of the planetary gear mechanism PG and the output member O. The case 2 includes a first radial extending wall 4 that extends radially at the sides of the planetary gear mechanism PG and the output member O facing in the first axial direction X1 such that the first radial extending wall 4 covers an opening end of the peripheral wall 5 facing in the first axial direction X1. The case 2 also includes a second radial extending wall 7 that extends radially at the sides of the planetary gear mechanism PG and the output member O facing in the second axial direction X2 such that the second radial extending wall 7 covers an opening end of the peripheral wall 5 facing in the second axial direction X2. The gear housing chamber 25 is surrounded by the peripheral wall 5, the first radial extending wall 4, and the second radial extending wall 7.

A through hole is axially formed in a radially inner side (a center portion) of the first radial extending wall 4. The input shaft I inserted into the through hole runs through the first radial extending wall 4 and is inserted into the gear housing chamber 25. A radially inner end of the first radial extending wall 4 rotatably supports the input shaft I from the radially outer side through a first input support bearing 64.

The first radial extending wall 4 includes a first output projecting portion 6 projecting in the second axial direction X2 up to the radially inner side of the output member O. An outer peripheral surface 6a of the first output projecting portion 6 rotatably supports the output member O from the radially inner side through a first output support bearing 61.

A through hole is axially formed in a radially inner side (a center portion) of the second radial extending wall 7. The first rotor shaft 20 inserted into the through hole runs through the second radial extending wall 7 and is inserted into the gear housing chamber 25. A radially inner end of the second radial extending wall 7 rotatably supports the first rotor shaft 20 from the radially outer side through a first rotary electric machine bearing 63.

The second radial extending wall 7 includes a second output projecting portion 8 projecting in the first axial direction X1 up to the radially inner side of the output member O. An outer peripheral surface 8a of the second output projecting portion 8 rotatably supports the output member O from the radially inner side through a second output support bearing 62.

<First Rotor Shaft 20>

The first rotor shaft 20 rotates together with the sun gear S, and is drivingly coupled to the first rotary electric machine MG1.

In the embodiment, the sun gear S includes an extending cylindrical portion 70 that is a cylindrical member extending in the second axial direction X2 from a portion including teeth (hereinafter referred to as a tooth portion). The sun gear S also includes a cylindrical member (tooth cylindrical portion 71) on the inner peripheral side of the tooth portion.

The first rotor shaft 20 has a cylindrical shape, and an outer peripheral surface of the extending cylindrical portion 70 of the sun gear S is spline-coupled to an inner peripheral surface of an end of the first rotor shaft 20 in the first axial direction X1 such that the first rotor shaft 20 and the sun gear S rotate together.

The first rotor shaft 20 extends from the sun gear S axially in the second axial direction X2. In the embodiment, the first rotor shaft 20 has a cylindrical shape over the entire axial direction (see FIG. 1). A pump drive shaft 54 and the input shaft I are disposed radially inward of the first rotor shaft 20.

The first rotor shaft 20 is rotatably supported on a radially inner end of the second radial extending wall 7 through the first rotary electric machine bearing 63.

<Input Shaft I>

The input shaft I rotates together with the carrier CA, and is drivingly coupled to the internal combustion engine E. The internal combustion engine E rotates only in one direction, and thus, the input shaft I is a unidirectional rotating member that rotates only in one direction.

In the embodiment, a coupling member 51 coupling the carrier CA and the input shaft I extends further in the radial direction of the input shaft I in the first axial direction X1 than an end 21 of the sun gear S facing in the first axial direction X1 (hereinafter referred to as a first end 21).

In the embodiment, the coupling member 51 is integrally formed with the input shaft I. Specifically, the coupling member 51 is located between the first end 21 and the first radial extending wall 4, and has a flange shape extending from a shaft body portion 29 of the input shaft I radially outward. A radially outer end of the coupling member 51 is coupled to a radially inner end of a first plate portion 90 of the carrier CA having an annular plate shape. The first plate portion 90 is disposed on the first axial direction X1 side with respect to the pinion gears P.

A surface of the coupling member 51 facing in the first axial direction X1 is in contact with the first radial extending wall 4 through a first thrust bearing 67. A surface of the coupling member 51 facing in the second axial direction X2 is in contact with the first end 21 of the sun gear S through the second thrust bearing 68.

In the embodiment, the input shaft I is drivingly coupled to the internal combustion engine E through the damper DP. Specifically, an end of the input shaft I facing in the first axial direction X1 is coupled to an output member of the damper DP, and an input member of the damper DP is coupled to the engine output shaft Eo (see FIG. 1). A spring for attenuating rotation vibrations of the shaft is provided between the output member and the input member of the damper DP.

The input shaft I includes an insertion portion 23 that is to be inserted from the first end 21 of the sun gear S and disposed radially inward of the sun gear S and the first rotor shaft 20.

In the embodiment, the insertion portion 23 is a cylindrical member extending further in the second axial direction X2 than the coupling member 51. The insertion portion 23 extends in the second axial direction X2 from the coupling member 51 and the first end 21 of the sun gear S to a location near the radially inner side of the second radial extending wall 7. An end of the insertion portion 23 facing in the second axial direction X2 is rotatably supported on an inner peripheral surface of the first rotor shaft 20 through the second input support bearing 65. An outer peripheral surface of the first rotor shaft 20 is rotatably supported on the radially inner end of the second radial extending wall 7 through the first rotary electric machine bearing 63. Thus, the insertion portion 23 (input shaft I) is rotatably supported on the radially inner end of the second radial extending wall 7 through the second input support bearing 65, the first rotor shaft 20, and the first rotary electric machine bearing 63. Thus, the insertion portion 23 (input shaft I) is supported in such a state that the insertion portion 23 and the first rotor shaft 20 can rotate relative to each other.

The input shaft I is rotatably supported on the radially inner end of the first radial extending wall 4 through the first input support bearing 64. An oil seal 59 for suppressing leakage of oil from the gear housing chamber 25 toward the first axial direction X1 is provided between the first radial extending wall 4 and the input shaft I and is disposed at a side of the first input support bearing 64 facing in the first axial direction Xl.

An internal oil passage L1 extends axially inside the input shaft I. The internal oil passage L1 extends in the first axial direction X1 from an end of the input shaft I (insertion portion 23) facing in the second axial direction X2 to a location at the coupling member 51 facing in the first axial direction X1 through the inside of the insertion portion 23.

The input shaft I has a supply hole H1 that communicates with the internal oil passage L1 at the coupling member 51 facing in the first axial direction X1 and is open at an outer peripheral surface 30 of the input shaft I (shaft body portion 29). The supply hole H1 is a columnar hole radially extending from the internal oil passage LI to the outer peripheral surface 30.

In the embodiment, the input shaft I includes a supply hole H2 that communicates with the internal oil passage L1 at a radially inner side of the sun gear S and is open at an outer peripheral surface 73 of the insertion portion 23.

In the embodiment, the oil pump OP is disposed at a side of the first rotor shaft 20 facing in the second axial direction X2, and is driven by rotation of the pump drive shaft 54 coupled to the input shaft I such that the pump drive shaft 54 can rotate together with the input shaft I (see FIG. 1). The pump drive shaft 54 axially extends from the oil pump OP to the end of the input shaft I facing in the second axial direction X2 in a space radially inward of the first rotor shaft 20 having a cylindrical shape. The insertion portion 23 of the input shaft I includes a shaft coupling cylindrical portion 91 that is open at the end of the insertion portion 23 facing in the second axial direction X2. An outer peripheral surface of an end of the pump drive shaft 54 facing in the first axial direction X1 is spline-coupled to an inner peripheral surface of the shaft coupling cylindrical portion 91 such that the pump drive shaft 54 and the shaft coupling cylindrical portion 91 can rotate together. A drive shaft oil passage L2 is formed in the pump drive shaft 54 so as to communicate between axial ends of the pump drive shaft 54 in the axial direction. Oil discharged from the oil pump OP passes through the drive shaft oil passage L2 in the pump drive shaft 54 and the internal oil passage L1 in the input shaft I and is sent to the supply holes H1 and H2. As described below, oil is supplied from the supply holes H1 and H2 to the planetary gear mechanism PG and the bearings, for example, for lubrication and cooling of these members.

<Output Member O>

The output member O rotates together with the ring gear R and is drivingly coupled to the wheels W.

The output member O includes an output cylindrical portion 26 having a cylindrical shape. The planetary gear mechanism PG is disposed radially inward of the output cylindrical portion 26. The ring gear R is integrally formed with an inner peripheral surface 26b of the output cylindrical portion 26, and the output gear 40 is integrally formed with an outer peripheral surface of the output cylindrical portion 26.

The inner peripheral surface 26b of the output member O (output cylindrical portion 26) is rotatably supported from the radially inner side on the outer peripheral surface 6a of the first output projecting portion 6 through the first output support bearing 61 near an end thereof facing in the first axial direction X1. Near an end of the inner peripheral surface 26b facing in the second axial direction X2, the inner peripheral surface 26b is rotatably supported from the radially inner side on the outer peripheral surface 8a of the second output projecting portion 8 through the second output support bearing 62.

The periphery of the planetary gear mechanism PG is a housing chamber (hereinafter referred to as a planetary housing chamber 24) surrounded by the output member O, the first output support bearing 61, the first output projecting portion 6, the second output support bearing 62, and the second output projecting portion 8 such that oil supplied to the planetary gear mechanism PG is easily accumulated in the planetary housing chamber 24.

The output cylindrical portion 26 has an oil removing hole 28 radially penetrating the output cylindrical portion 26. The size of the oil removing hole 28 is adjusted in such a manner that oil accumulated in the planetary housing chamber 24 can be appropriately discharged.

<Planetary Gear Mechanism PG>

The planetary gear mechanism PG includes the sun gear S, the ring gear R, and the carrier CA. The plurality of pinion gears P are provided between the external teeth of the sun gear S and the internal teeth of the ring gear R. The number of the pinion shafts PA that rotatably support the pinion gears P is equal to the number of the pinion gears P. Each of the pinion shafts PA has a columnar shape. In the embodiment, the single pinion planetary gear mechanism PG is used, and includes three pinion gears P and three pinion shafts PA.

A columnar through hole that extends axially is formed in a center portion of each of the pinion gears P, and each of the pinion shaft PA penetrates the through hole. The pinion bearing PB is provided between the inner peripheral surface of the through hole in each of the pinion gears P and the outer peripheral surface of each of the pinion shafts PA. The pinion shafts PA rotatably support the pinion gears P through the pinion bearings PB.

Figure 4:
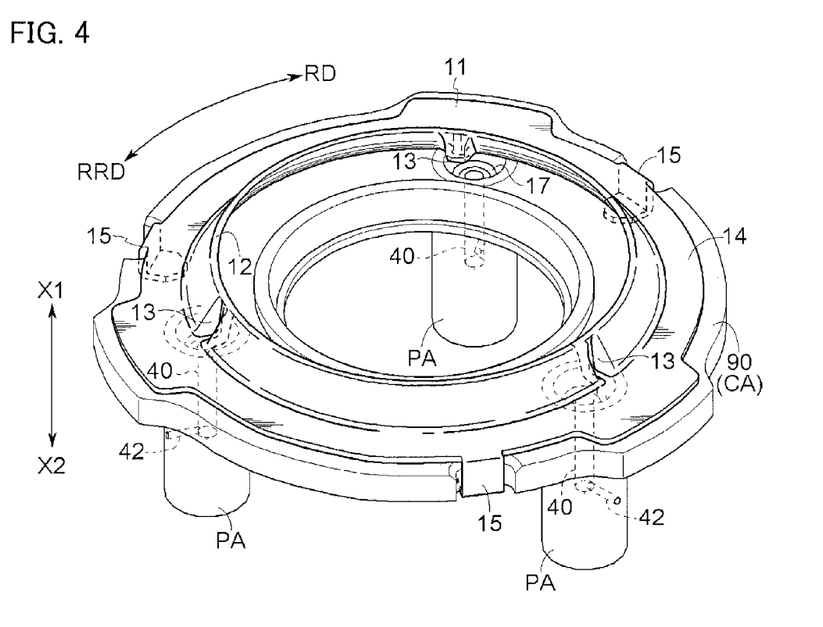
FIG. 4 is a perspective view illustrating an oil receiver, a carrier, and pinion shafts according to the embodiment of the present disclosure.
Figure 6:
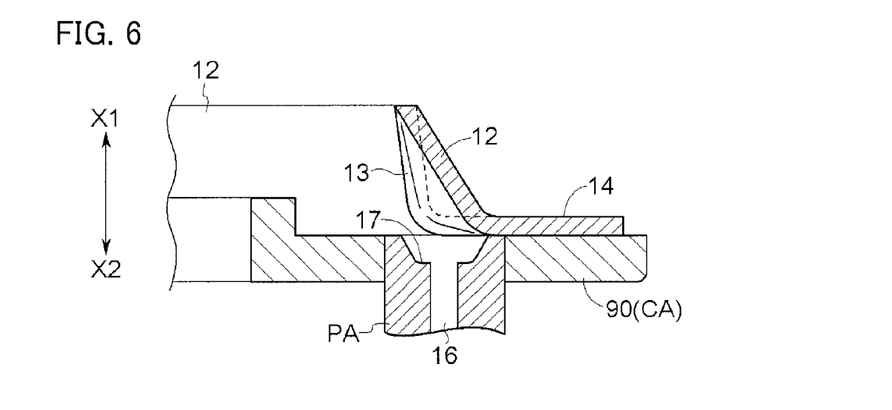
FIG. 6 is an axial cross-sectional view illustrating the oil receiver, the carrier, and the pinion shaft according to the embodiment of the present disclosure, which is taken along a plane parallel to an axial direction.

As illustrated in FIGS. 2, 4, and 6, the pinion shafts PA are coupled to the carrier CA in such a manner that the pinion shafts PA rotate together with the carrier CA. The pinion shafts PA are arranged at regular intervals in the circumferential direction. The carrier CA includes a first plate portion 90 having an annular plate shape and is disposed at a side of the pinion gears P facing in the first axial direction X1. The carrier CA includes a second plate portion 93 having an annular plate shape and is disposed at a side of the pinion gears P facing in the second axial direction X2. A radially inner end of the first plate portion 90 is coupled to the radially outer end of the coupling member 51 such that the first plate portion 90 can rotate together with the coupling member 51. A radially outer end of the second plate portion 93 is coupled to a radially outer end of the first plate portion 90 through a cylindrical coupling member 94 such that the second plate portion 93 can rotate together with the first plate portion 90.

The first plate portion 90 and the second plate portion 93 have columnar through holes that extend axially and are disposed at different locations in the circumferential direction corresponding to the pinion shafts PA. The pinion shafts PA are coupled to the first plate portion 90 and the second plate portion 93 in such a manner that ends of the pinion shafts PA facing in the first axial direction X1 and ends of the pinion shafts PA facing in the second axial direction X2 are inserted in the through hole of the first plate portion 90 and the through hole of the second plate portion 93, respectively, so that the pinion shafts PA rotate together with the first plate portion 90 and the second plate portion 93.

The first openings 17 that are open in the first axial direction X1 are formed in the ends of the pinion shafts PA facing in the first axial direction X1, and second openings 19 that are open in the second axial direction X2 are formed in the ends of the pinion shafts PA facing in the second axial direction X2. The first openings 17 and the second openings 19 are swaged from the radial inner side to the outer side, and the pinion shafts PA are coupled to the first plate portion 90 and the second plate portion 93.

<In-shaft Oil Passage 16>

The in-shaft oil passage 16 for supplying lubricating oil to the pinion bearing PB is provided in each of the pinion shafts PA. The in-shaft oil passage 16 in each of the pinion shafts PA includes the first opening 17 that is open at the end face of the carrier CA facing in the first axial direction X1.

In the embodiment, in the axial center portion of each of the pinion shafts PA, the in-shaft oil passage 16 extends in the first axial direction X1 from the axial center portion of the pinion shaft PA and is open to the first opening 17. Lubricating oil is supplied from the first openings 17 into the in-shaft oil passages 16. In the embodiment, the first opening 17 is larger in diameter than the in-shaft oil passage 16.

The axial center portion of each of the pinion shafts PA includes a discharge hole 18 that extends from the in-shaft oil passage 16 radially outward of the pinion shaft PA and the carrier CA, and is open at the outer peripheral surface of the pinion shaft PA. Lubricating oil supplied to the in-shaft oil passage 16 is discharged from the discharge hole 18 and is supplied to the pinion bearing PB.

<Oil Receiver 11>

The oil receiver 11 is a member that receives lubricating oil supplied from the oil supply unit 9 and leads the oil to the in-shaft oil passages 16 in the pinion shafts PA, and is attached to the carrier CA. The oil receiver 11 includes the oil receiving portion 12 that extends from the end face of the carrier CA facing in the first axial direction X1 to the first axial direction X1 and radially inward, and is formed to be continuous over the entire circumference. That is, the oil receiving portion 12 has an inclined surface extending from the end face of the carrier CA facing in the first axial direction X1 to the first axial direction X1 and radially inward.

In the embodiment, the cross-sectional shape of the oil receiving portion 12 taken along a plane orthogonal to the axial direction is circular except for the projecting portions 13, and a center of the circular cross section coincides with the rotation axial center of the carrier CA. The diameter of the circular cross section of the oil receiving portion 12 gradually decreases at a constant rate toward the first axial direction X1.

In the embodiment, an axial width (projection length) of the oil receiving portion 12 is constant, and the oil receiving portion 12 has a truncated conical shape.

As illustrated in FIG. 6, an end of the oil receiving portion 12 facing in the second axial direction X2 is disposed at a location overlapping the first openings 17 when viewed in the axial direction of the carrier CA. In the embodiment, the end of the oil receiving portion 12 facing in the second axial direction X2 is disposed at a location overlapping the first openings 17 and portions of the in-shaft oil passages 16 radially outward of the radial center portions of the in-shaft oil passages 16.

In the embodiment, as illustrated in FIGS. 4 through 6, the oil receiver 11 includes an attachment portion 14 having an annular plate shape and configured to contact the end face of the carrier CA (first plate portion 90) facing in the first axial direction X1. An end face of the attachment portion 14 facing in the second axial direction X2 is in contact with an end face of the first plate portion 90 facing in the first axial direction X1 over the entire circumference thereof. The center of the attachment portion 14 coincides with the rotation axial center of the carrier CA. The oil receiving portion 12 extends from a radially inner end of the attachment portion 14 to the first axial direction X1 and radially inward.

An outer peripheral portion of the oil receiver 11 is partially swaged to the carrier CA, and the oil receiver 11 is attached to the carrier CA. In the embodiment, as illustrated in FIG. 4, the oil receiver 11 includes a plurality of swaging portions 15 (three swaging portions in this example) extending in the second axial direction X2 from a plurality of locations on a radially outer end of the attachment portion 14. The swaging portions 15 are inserted in recesses (three recesses in this example) formed radially inward and provided in a radially outer end of the first plate portion 90, and then ends of the swaging portions 15 facing in the second axial direction X2 are swaged (bent) radially inward so as to contact an end face of the first plate portion 90 facing in the second axial direction X2.

As illustrated in FIG. 2, lubricating oil discharged from the supply hole H1 of the input shaft I is supplied to the first thrust bearing 67 between the coupling member 51 and the first radial extending wall 4, and flows radially outward in a clearance at the first thrust bearing 67. Thereafter, the lubricating oil moves away from the radially outer end of the first thrust bearing 67 by a centrifugal force caused by rotation of the input shaft I, and is scattered radially outward. Here, the first thrust bearing 67 corresponds to the "oil supply unit 9" of the present disclosure.

The first thrust bearing 67 is disposed radially inward of the oil receiving portion 12. The lubricating oil scattered radially outward from the first thrust bearing 67 adheres to the radially inner surface of the oil receiving portion 12. The lubricating oil supplied from the first thrust bearing 67 is dispersed and adheres to the oil receiving portion 12 over the entire circumference thereof.

Since the carrier CA rotates together with the input shaft I, the oil receiving portion 12 fixed to the carrier CA also rotates together with the input shaft I. As illustrated in schematic views of FIGS. 7 and 9, a centrifugal force caused by rotation is applied to lubricating oil adhering to the inclined surface of the oil receiving portion 12, and thus, the lubricating oil flows in the second axial direction X2 (the direction toward the carrier CA) along the inclined surface extending in the first axial direction X1 and radially inward. At this time, the lubricating oil also flows relatively to the oil receiving portion 12, that is, flows along a direction opposite to a rotation direction RD of the oil receiving portion 12 (hereinafter referred to as a reverse rotation direction RRD), due to air resistance. Accordingly, the lubricating oil flows along the inclined surface radially inward of the oil receiving portion 12 toward the second axial direction X2 and the reverse rotation direction RRD with respect to the rotating oil receiving portion 12.

COMPARATIVE EXAMPLES

Figure 7:
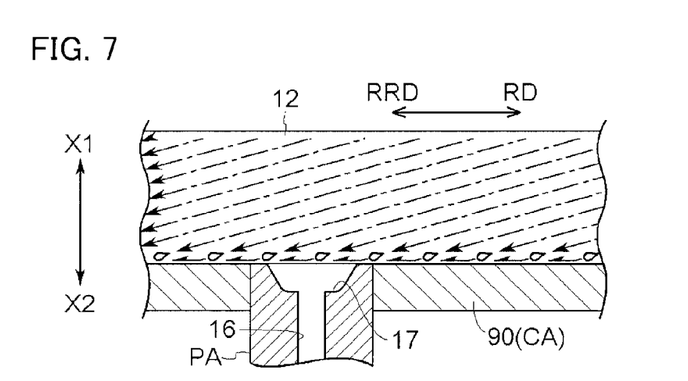
FIG. 7 schematically illustrates lubricating oil flowing along an inclined surface of an oil receiving portion according to a comparative example of the present disclosure.
Figure 8:
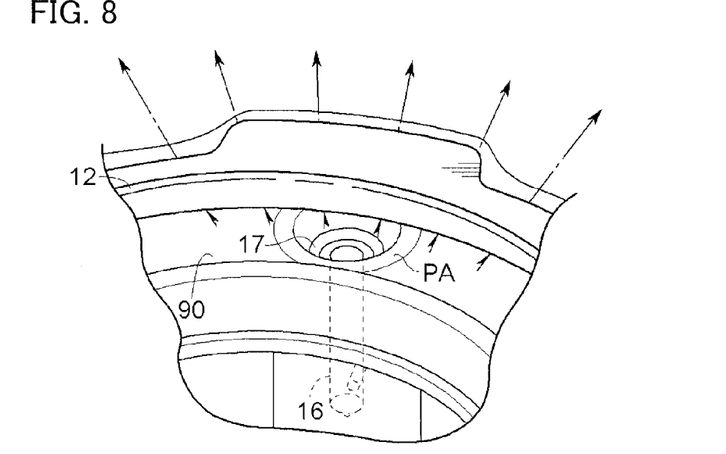
FIG. 8 schematically illustrates lubricating oil leaking radially outward through a clearance between an oil receiver and a carrier according to the comparative example of the present disclosure.

FIG. 7 schematically illustrates a comparative example in which the oil receiving portion 12 does not include projecting portions 13, unlike the embodiment. The lubricating oil dispersed over the entire circumference of the oil receiving portion 12 and adhering thereto is dispersed over the entire circumference and flows to the end of the oil receiving portion 12 facing in the second axial direction X2. Since no members such as a sealing member are provided between the first plate portion 90 of the carrier CA and the attachment portion 14 of the oil receiver 11, the carrier CA and the oil receiver 11 are not completely in close contact with each other, and a small clearance is formed. Thus, as schematically illustrated in FIG. 8, lubricating oil that has flowed to the end of the oil receiving portion 12 facing in the second axial direction X2 leaks radially outward through the clearance between the carrier CA and the oil receiver 11 by a centrifugal force, and is not supplied to the in-shaft oil passages 16 of the pinion shafts PA. Accordingly, the amount of lubricating oil supplied to the in-shaft oil passages 16 decreases by an amount corresponding to the amount of leakage of lubricating oil.

<Solution by Using Projecting Portions 13>

To solve the problems described above, as illustrated in FIGS. 4 through 6, the oil receiving portion 12 includes the projecting portions 13 partially projecting radially inward of the carrier CA. In the embodiment, the projecting portions 13 are protrusions that project radially inward and extending axially and radially.

Figure 9:
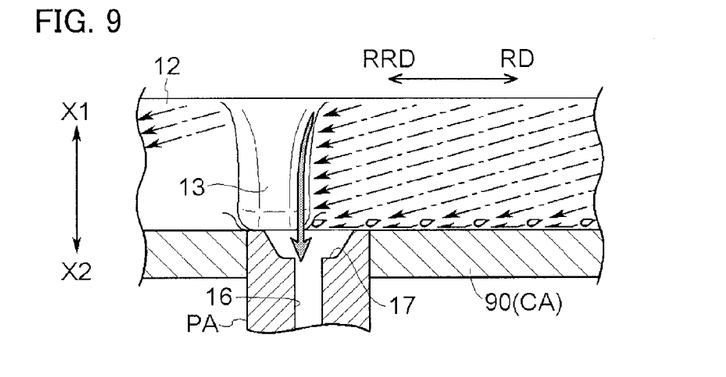
FIG. 9 schematically illustrates a state according to the embodiment of the present disclosure in which lubricating oil flowing along an inclined surface of an oil receiving portion is blocked by a projecting portion.

As schematically illustrated in FIG. 9, lubricating oil flowing along the inclined surface of the oil receiving portion 12 in the second axial direction X2 and the reverse rotation direction RRD with respect to the oil receiving portion 12 is blocked by the projecting portions 13. The blocked lubricating oil flows along ends of the projecting portions 13 facing in the rotation direction RD, to the second axial direction X2. Thus, the projecting portions 13 block the lubricating oil dispersed over the entire circumference of the oil receiving portion 12 and adhering thereto, so that the lubricating oil can be collected to the ends of the projecting portions 13 facing in the rotation direction RD and in the second axial direction X2.

Accordingly, as described in the comparative example, it is possible to suppress dispersion of lubricating oil flowing over the entire circumference when the oil flows to the end of the oil receiving portion 12 facing in the second axial direction X2. As a result, the lubricating oil can be collected at the ends of the projecting portions 13 facing in the second axial direction X2. The amount of oil leaking radially outward through the clearance between the carrier CA and the oil receiver 11 can be reduced.

At the ends of the projecting portions 13 facing in the rotation direction RD, the amount of blocked lubricating oil increases toward the second axial direction X2. In the embodiment, as illustrated in FIG. 6, the height of the projecting portions 13 in the radially inward direction increases toward the second axial direction X2. Thus, the height of the projecting portions 13 increases in accordance with an increased amount of lubricating oil, thus ensuring blockage of the lubricating oil.

As illustrated in FIGS. 4 through 6, the plurality of projecting portions 13 are provided corresponding to the plurality of first openings 17. As illustrated in FIG. 5, each of the projecting portions 13 is disposed ahead, in the rotation direction RD of the carrier CA, of the center location CT between two of the first openings 17 that are adjacent to each other in the circumferential direction of the carrier CA. In this configuration, the first openings 17 can be disposed closer to the projecting portions 13 and also on the rotation direction RD side of the projecting portions 13, so that the lubricating oil blocked by the projecting portions 13 can be easily led to the first openings 17.

In the embodiment, as illustrated in FIG. 5, the projecting portions 13 are disposed so as to overlap the pinion shafts PA when viewed in the axial direction of the carrier CA. In this configuration, the lubricating oil blocked by the projecting portions 13 can be easily led to the first openings 17 formed in the pinion shafts PA.

In the embodiment, the projecting portions 13 are disposed ahead, in the reverse rotation direction RRD of the carrier CA, of the axial center portions of the pinion shafts PA. In this manner, the projecting portions 13 are disposed ahead of the carrier CA in the reverse rotation direction RRD, so that the ends of the projecting portions 13 facing in the rotation direction RD are disposed closer to the axial center portions of the pinion shafts PA.

The projecting portions 13 are disposed so as to overlap the first openings 17 when viewed in the axial direction of the carrier CA. More specifically, the ends of the projecting portions 13 facing in the rotation direction RD are disposed so as to overlap the first openings 17 when viewed in the axial direction of the carrier CA. In addition, the ends of the projecting portions 13 facing in the rotation direction RD are disposed so as to overlap the in-shaft oil passages 16 when viewed in the axial direction of the carrier CA. In this manner, the lubricating oil blocked by the ends of the projecting portions 13 facing in the rotation direction RD can be easily led to the first openings 17 and the in-shaft oil passages 16.

[Other Embodiments]

Lastly, other embodiments of the present disclosure will be described. The constitution disclosed in each of the following embodiments is not necessarily applied in an individual manner, and may be applied in combination with the constitution disclosed in other embodiments as far as no contradiction arises.

(1) In the example described in the above embodiment, the projecting portions 13 overlap the pinion shafts PA when viewed in the axial direction of the carrier CA. However, embodiments of the present disclosure are not limited to this example. That is, each of the projecting portions 13 only need to be disposed ahead, in the rotation direction RD of the carrier CA, of the center location CT between two of the first openings 17 that are adjacent to each other in the circumferential direction of the carrier CA, and do not need to overlap the pinion shafts PA.

(2) In the embodiment described above, the projecting portions 13 overlap the first openings 17 when viewed in the axial direction of the carrier CA. However, embodiments of the present disclosure are not limited to this example. That is, the projecting portions 13 do not need to overlap the first openings 17 when viewed in the axial direction of the carrier CA.

(3) In the embodiment described above, the end of the oil receiving portion 12 facing in the second axial direction X2 overlaps the first openings 17 when viewed in the axial direction of the carrier CA. However, embodiments of the present disclosure are not limited to this example. That is, the end of the oil receiving portion 12 facing in the second axial direction X2 does not need to overlap the first openings 17 when viewed in the axial direction of the carrier CA, and may be located radially outward of the first openings 17, for example.

(4) In the embodiment described above, the outer peripheral portion of the oil receiver 11 is partially swaged to the carrier CA, and the oil receiver 11 is attached to the carrier CA. However, embodiments of the present disclosure are not limited to this example. That is, the oil receiver 11 may be attached to the carrier CA by a method such as screwing or welding except swaging.

(5) In the embodiment described above, no members such as a sealing member are provided between the first plate portion 90 of the carrier CA and the attachment portion 14 of the oil receiver 11, and the carrier CA and the oil receiver 11 are in direct contact with each other. However, embodiments of the present disclosure are not limited to this example. That is, other members such as a sealing member may be sandwiched between the first plate portion 90 of the carrier CA and the attachment portion 14 of the oil receiver 11.

(6) In the embodiment described above, the planetary gear mechanism PG is a single pinion planetary gear mechanism. However, embodiments of the present disclosure are not limited to this example. That is, the planetary gear mechanism PG may be a planetary gear mechanism of any type such as a double pinion type or a Ravigneaux type, as long as the planetary gear mechanism PG includes a sun gear, a ring gear, and a carrier.

(7) In the embodiment described above, the vehicle drive transfer apparatus 1 includes the first rotary electric machine MG1, the second rotary electric machine MG2, and the counter gear mechanism Ct, for example, in addition to the planetary gear mechanism PG, for example. However, embodiments of the present disclosure are not limited to this example. That is, the vehicle drive transfer apparatus 1 only needs to include at least the planetary gear mechanism PG, the in-shaft oil passage 16, and the oil receiver 11, for example, and may include any optional power transfer mechanism such as a driving source or a gear mechanism.

(8) In the embodiment described above, the internal combustion engine E is drivingly coupled to the input shaft I that is a unidirectional rotating member. However, embodiments of the present disclosure are not limited to this example. That is, the input shaft I serving as a unidirectional rotating member may be coupled to a member that rotates only in one direction, except the internal combustion engine E.

INDUSTRIAL APPLICABILITY

The present disclosure is suitably applicable to a vehicle drive transfer apparatus including: a planetary gear mechanism including a carrier for supporting a sun gear, a ring gear, and pinion gears through pinion shafts and pinion bearings; an in-shaft oil passage provided in each of the pinion shafts to supply lubricating oil to each of the pinion bearings; and an oil receiver attached to the carrier to receive lubricating oil supplied from an oil supply unit and lead the lubricating oil to the in-shaft oil passage in each of the pinion shafts.

The invention claimed is:

1. A vehicle drive transfer apparatus comprising:
a planetary gear mechanism including a carrier for supporting a sun gear, a ring gear, and a plurality of pinion gears through pinion shafts and pinion bearings, wherein an in-shaft oil passage is provided in each of the pinion shafts to supply lubricating oil to each of the pinion bearings; and
an oil receiver attached to the carrier to receive lubricating oil supplied from an oil supplier and lead the lubricating oil to the in-shaft oil passage in each of the pinion shafts, wherein
the carrier is coupled to a unidirectional rotating member that rotates only in one direction,
the in-shaft oil passage in each of the pinion shafts has an opening that is open at an end face of the carrier facing in a first axial direction that is one axial direction side of the carrier,
the oil receiver includes an oil receiving portion that extends from the end face of the carrier facing in the first axial direction to the first axial direction and radially inward and is formed to be continuous over an entire circumference of the oil receiver,
the oil supplier is disposed radially inward of the oil receiving portion,
the oil receiving portion includes a projecting portion partially projecting radially inward of the carrier,
a plurality of the projecting portions are provided corresponding to a plurality of the openings, and
each of the projecting portions is disposed ahead, in a rotation direction of the carrier, of a center location between two of the openings that are adjacent to each other in a circumferential direction of the carrier.

2. The vehicle drive transfer apparatus according to claim 1, wherein
the projecting portions are disposed so as to overlap the pinion shafts when viewed in the axial direction of the carrier.

3. The vehicle drive transfer apparatus according to claim 2, wherein
the projecting portions are disposed so as to overlap the openings when viewed in the axial direction of the carrier.

4. The vehicle drive transfer apparatus according to claim 3, wherein
an end of the oil receiving portion opposite to the first axial direction is disposed so as to overlap the openings when viewed in the axial direction of the carrier.

5. The vehicle drive transfer apparatus according to a claim 4, wherein
an outer peripheral portion of the oil receiver is partially swaged to the carrier, and the oil receiver is attached to the carrier.

6. The vehicle drive transfer apparatus according to claim 5, wherein
the oil receiver includes an attachment portion that has an annular plate shape and is in contact with the end face of the carrier facing in the first axial direction, and
the oil receiving portion is formed so as to extend from a radially inner end of the attachment portion to the first axial direction and radially inward.

7. The vehicle drive transfer apparatus according to claim 2, wherein
an end of the oil receiving portion opposite to the first axial direction is disposed so as to overlap the openings when viewed in the axial direction of the carrier.

8. The vehicle drive transfer apparatus according to claim 7, wherein an outer peripheral portion of the oil receiver is partially swaged to the carrier, and the oil receiver is attached to the carrier.

9. The vehicle drive transfer apparatus according to claim 8, wherein
the oil receiver includes an attachment portion that has an annular plate shape and is in contact with the end face of the carrier facing in the first axial direction, and
the oil receiving portion is formed so as to extend from a radially inner end of the attachment portion to the first axial direction and radially inward.

10. The vehicle drive transfer apparatus according to claim 1, wherein
the projecting portions are disposed so as to overlap the openings when viewed in the axial direction of the carrier.

11. The vehicle drive transfer apparatus according to claim 10, wherein
an end of the oil receiving portion opposite to the first axial direction is disposed so as to overlap the openings when viewed in the axial direction of the carrier.

12. The vehicle drive transfer apparatus according to claim 11, wherein
an outer peripheral portion of the oil receiver is partially swaged to the carrier, and the oil receiver is attached to the carrier.

13. The vehicle drive transfer apparatus according to claim 12, wherein
the oil receiver includes an attachment portion that has an annular plate shape and is in contact with the end face of the carrier facing in the first axial direction, and
the oil receiving portion is formed so as to extend from a radially inner end of the attachment portion to the first axial direction and radially inward.

14. The vehicle drive transfer apparatus according to claim 1, wherein
an end of the oil receiving portion opposite to the first axial direction is disposed so as to overlap the openings when viewed in the axial direction of the carrier.

15. The vehicle drive transfer apparatus according to claim 14, wherein
an outer peripheral portion of the oil receiver is partially swaged to the carrier, and the oil receiver is attached to the carrier.

16. The vehicle drive transfer apparatus according to claim 15, wherein
the oil receiver includes an attachment portion that has an annular plate shape and is in contact with the end face of the carrier facing in the first axial direction, and
the oil receiving portion is formed so as to extend from a radially inner end of the attachment portion to the first axial direction and radially inward.

17. The vehicle drive transfer apparatus according to claim 1, wherein
an outer peripheral portion of the oil receiver is partially swaged to the carrier, and the oil receiver is attached to the carrier.

18. The vehicle drive transfer apparatus according to claim 17, wherein
the oil receiver includes an attachment portion that has an annular plate shape and is in contact with the end face of the carrier facing in the first axial direction, and
the oil receiving portion is formed so as to extend from a radially inner end of the attachment portion to the first axial direction and radially inward.

19. The vehicle drive transfer apparatus according to claim 1, wherein
the oil receiver includes an attachment portion that has an annular plate shape and is in contact with the end face of the carrier facing in the first axial direction, and
the oil receiving portion is formed so as to extend from a radially inner end of the attachment portion to the first axial direction and radially inward.

\* \* \* \* \*